(No Model.)

C. ELIKAN.
SPOOL OR BOBBIN.

No. 287,426. Patented Oct. 30, 1883.

Witnesses:

Inventor:
Camil Elikan
By his Attys,

UNITED STATES PATENT OFFICE.

CAMIL ELIKAN, OF SAN FRANCISCO, CALIFORNIA.

SPOOL OR BOBBIN.

SPECIFICATION forming part of Letters Patent No. 287,426, dated October 30, 1883.

Application filed November 5, 1881. (No model.)

*To all whom it may concern:*

Be it known that I, CAMIL ELIKAN, of the city and county of San Francisco, in the State of California, have made and invented an Improved Spool or Bobbin, of which the following is a specification.

The invention will be understood as hereinafter set forth and claimed.

The accompanying drawings form a part of this specification and illustrate the invention.

Figure 1:
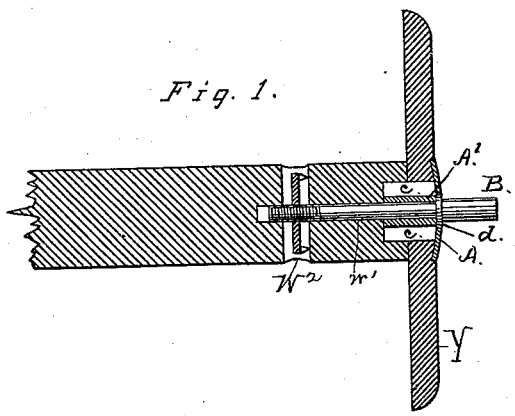
Figure 2:
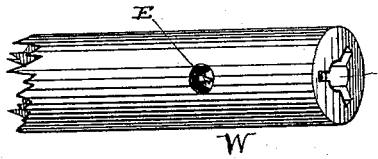
Figure 3:
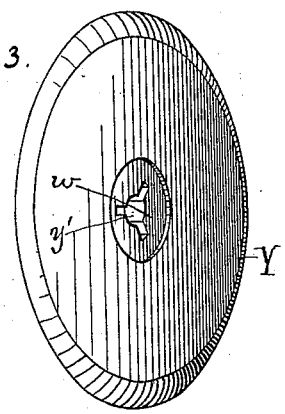
Figure 4:
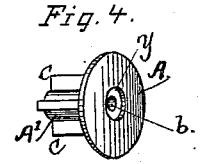
Figure 5:
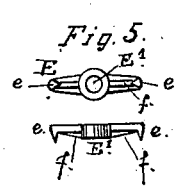
Figure 6:
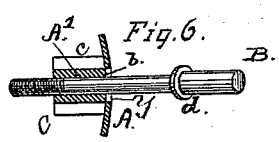

Figure 1 is a longitudinal section through one end of the spool body, head, and fastening device. Figs. 2, 3, and 4 show some of the parts in detail. Fig. 5 is a detail of the nut, showing it in two positions. Fig. 6 is a detail of the fastening-piece and spindle, the fastening-piece being in section.

Similar letters of reference indicate corresponding parts in all the figures.

W is the spool-body, broken off at one end. It is provided with a central bore, $w'$, extending into it from the finished end. Near the bottom of this bore a transverse opening, $W^2$, is made, extending from side to side of the spool-body. At the front of the finished end the bore $w'$ is enlarged and provided with divergent slots, as shown at $W'$. The head Y is provided with a central opening, $y'$, corresponding to the opening $W'$ in the body of the spool, and has a countersink or depression, $w$.

A metal fastening-piece is formed with a plate, A, and shank $A'$. The plate A is provided with a depression, $y$, and the shank $A'$ has wings or ribs $c$ formed around it. This fastening-piece fits into the head and end of the body of the spool through the openings $y'$ $W'$. A central aperture, $b$, is formed through the fastening-piece for the reception of the spindle B. This spindle B is passed through the aperture $b$ and bore $w'$, and has a collar, $d$, which fits into the depression $y$ when the parts are in place. The spindle B is screw-threaded at its inner end. The plate A of the fastening-piece lies in the depression $w$ when the parts are in place.

A nut, E, inserted in the opening $W^2$, has a screw-threaded socket, $E'$, which receives screw-threaded end of the spindle B. The nut E is provided with barbs $e\ e$ and strengthening-ribs $f\ f$, which are turned toward the end of the spool-body, and the barbs take into the wood as the spindle is screwed in.

When the spool is completed, the parts are in the following position: The head Y is set upon the finished end of the spool-body, the openings $y'$ and $W'$ corresponding. The fastening-piece has its shank $A'$, having thereon wings or ribs $c$, inserted through these openings $y'\ W'$, and its plate A lying in the depression $w$. The spindle B, with its collar $d$ in the depression $y$, is inserted through the aperture $b$ and bore $w'$ and screwed into the nut E, which lies in the opening $W^2$. This is shown in section in Fig. 1. When the spindle is screwed down tight, the parts are securely held in place, and the spindle B extends beyond the plate A. This plate A being slightly curved, as shown, the collar $d$ of the spindle is held out to form a bearing for the part in which the exposed portion of the spindle works.

Having thus described my invention, what I claim, and desire to secure by Letters Patent, is—

1. The combination, with the spool head and body, of the fastening-piece A $A'$, provided with the wings or ribs $c$, inserted through correspondingly-formed openings in said head and body, and of the fastening-spindle B and nut E, whereby the parts are bound together, as set forth.

2. The combination, with the fastening-piece and spool body and head, of the spindle B, screw-threaded at its lower end, and nut E, provided with the barbs $e$, taking into the wood of the body of the spool when the nut is screwed up, as set forth.

3. The combination, with the spool-body provided with the bore $w'$, having divergent slots, as shown, and the transverse opening $W^2$, and the head provided with an opening, $y'$, having divergent slots, and the countersink $w$, of the fastening-piece provided with the plate A, having the ribbed shank $A'$, the depression $y$, and the aperture $b$, the spindle B, having its inner end screw-threaded, and provided with the collar $d$, and the nut E, having the screw-threaded socket $E'$ and barbs $e\ e$, as and for the purpose set forth.

Witness my hand and seal.

CAMIL ELIKAN. [L. S.]

Witnesses:
 EDWARD L. OSBORN,
 GEO. VINCENT.